United States Patent
Abe et al.

(10) Patent No.: US 6,801,489 B2
(45) Date of Patent: Oct. 5, 2004

(54) APPARATUS FOR REPRODUCING INFORMATION

(75) Inventors: Shinichiro Abe, Kawagoe (JP); Takayuki Iijima, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 418 days.

(21) Appl. No.: 10/052,568

(22) Filed: Jan. 23, 2002

(65) Prior Publication Data

US 2002/0110062 A1 Aug. 15, 2002

(30) Foreign Application Priority Data

Jan. 24, 2001 (JP) ............................ 2001-015724

(51) Int. Cl.[7] .................................................. G11B 5/09
(52) U.S. Cl. .............................. 369/47.33; 369/47.42; 369/53.3; 369/124.06
(58) Field of Search ................ 369/47.32, 47.33, 369/47.34, 47.42, 47.44, 47.48, 53.12, 53.3, 53.42, 53.43, 124.06, 47.43

(56) References Cited

U.S. PATENT DOCUMENTS 5,502,701 A * 3/1996 Kudo et al. ............ 369/53.12
6,310,848 B1 * 10/2001 Ueki .......................... 369/53.37
6,590,607 B1 * 7/2003 Taussig ..................... 348/208.4

* cited by examiner

Primary Examiner—Paul W. Huber
(74) Attorney, Agent, or Firm—Morgan, Lewis & Bockius LLP

(57) ABSTRACT

An information reproducing apparatus in which the compressed information read from a disc is written to the memory, the written compressed information is read out in the order of writing and is supplied to an expansion device to obtain reproduced information. Writing of the compressed information to the memory is stopped when the amount of compressed information written to the memory increases to a first predetermined amount and writing of the compressed information to the memory is restarted when the amount of compressed information written decreases to a second predetermined amount which is smaller than the first predetermined amount and which is an amount corresponding to the compression ratio of the compressed information. The rotation speed of a spindle motor during a writing interruption period is lower than that during a writing period.

4 Claims, 6 Drawing Sheets

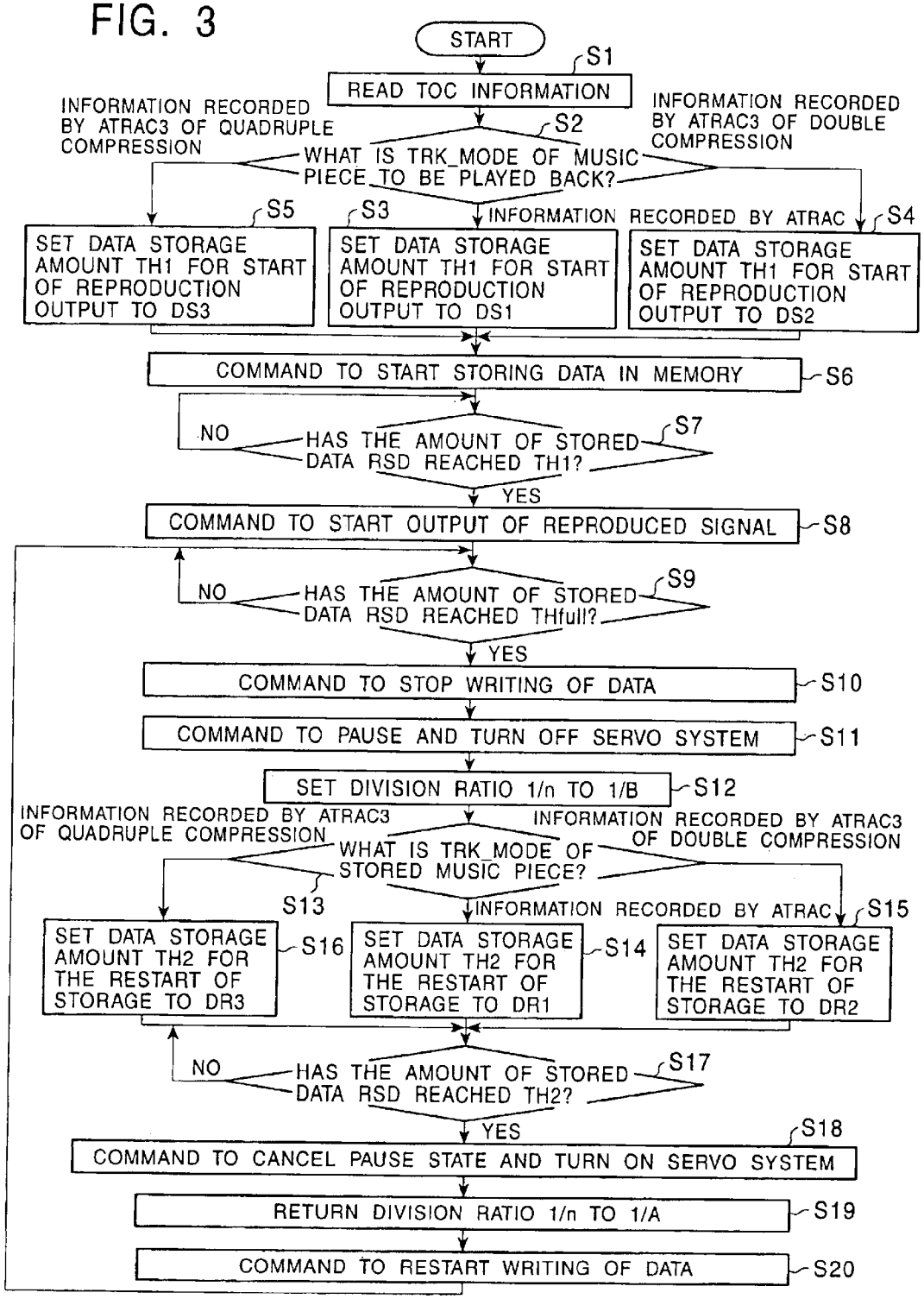

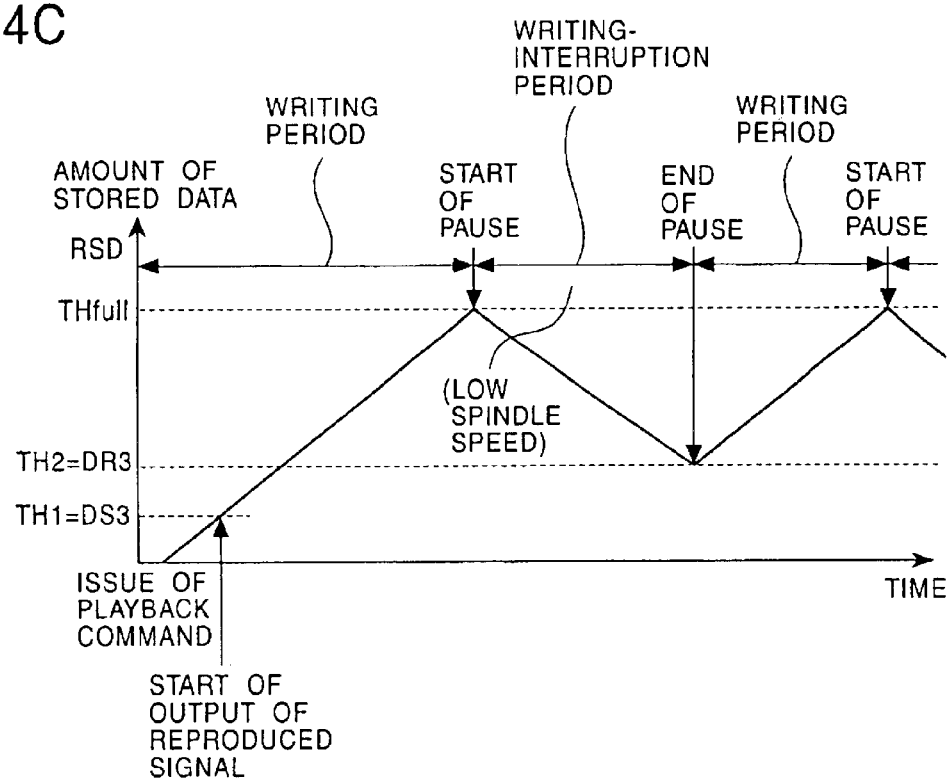

APPARATUS FOR REPRODUCING INFORMATION

BACKGROUND OF THE INVENTION

1. Field of the Invention

The present invention relates to an information reproducing apparatus which decompresses compressed information that is recorded on a disc and outputs the decompressed information as reproduction information.

2. Description of the Related Background Art

A mini-disc player, which is one type of information reproducing apparatus, has a DRAM (Dynamic Random Access Memory) for temporarily storing compressed data. In utilization of the DRAM, it is possible to improve vibration resistance by increasing the amount of information stored in the DRAM. The DRAM temporarily stores compressed information which has been read from an mini-disc by a pickup, while the compressed information that has been stored is read and then is expanded by a decoder, before being output as reproduction information. It is possible to reproduce by decompressing the compressed information in the DRAM while data including a misread error is read again, even when a read error is caused by vibration. Therefore, a problem of intermittent sound, so called skipping, can be prevented.

In playback of the mini-disc, when compressed information is stored in the DRAM up to the allowable storage capacity thereof, reading operation of the pickup is stopped. When the amount of compressed information stored in the DRAM decreases to permit storage of additional information, the pickup resumes the reading operation thereby storing the compressed information that has been read into the DRAM.

In the conventional mini-disc player, operation of a servo system including a spindle servo, which is related to reading data from a mini-disc, is not necessary during a writing-interruption period until the amount of compressed information stored in a memory such a DRAM decreases to a storage amount which permits restarting writing after reaching the allowable storage capacity in the memory. It is preferable to reduce power consumption by stopping, for example, a spindle motor, during the writing-interruption period. However, if the power supply to the servo system is completely stopped during the writing-interruption period, after the amount of data storage in the memory has decreased to the storage amount which permits restarting writing, a restart of data reading from the mini-disc by the pickup is delayed.

This problem is not limited to a mini-disc player. It also occurs in other information reproducing apparatuses each of which, for reproduction of compressed information recorded on a disc, write the compressed information to a memory and then read the compressed information from the memory for expansion and output the expanded information as reproduction information.

SUMMARY OF THE INVENTION

An object of the present invention is to provide an information reproducing apparatus which reduces power consumption during a writing-interruption period, and restarts writing to a memory immediately after termination of a writing-interruption period.

According to the present invention, there is provided an apparatus for reproducing information by expanding compressed information recorded on a disc, comprising: spindle driving means for driving a spindle motor for rotating the disc; reading means for reading the compressed information from the disc rotated by the spindle motor; memory control means for writing the compressed information read by the reading means to a memory, to read out the compressed information written from the memory in the order of writing and for supplying the read information to expansion means for expanding the compressed information read by the memory control means and outputting reproduced information based on the expanded information; and storage amount control means for stopping the writing of the compressed information to the memory by the memory control means when an amount of the compressed information unread from the memory after writing thereto increases to a first predetermined amount and for restarting the writing of the compressed information to the memory by the memory control means when the amount of the compressed information unread from the memory after writing thereto decreases to a second predetermined amount which is smaller than the first predetermined amount and which is an amount corresponding to the compression ratio of the compressed information, wherein the spindle driving means decreases the rotational speed of the spindle motor during a writing interruption period for a time from stoppage of the writing of the compressed information to the memory by the storage amount control means to the restarting of the writing, to a lower speed level than a rotational speed level of the spindle motor during a writing period when the compressed information is written to the memory.

BRIEF DESCRIPTION OF THE DRAWINGS

FIG. 3 is a flow chart showing the operation of a player controller;

FIGS. 4A to 4C are diagrams showing variations in the amount of stored data RSD when a mini-disc is played.

DETAILED DESCRIPTION OF THE PREFERRED EMBODIMENTS

A preferred embodiment of the present invention will be described in detail below with reference to the accompanying drawings.

Figure 1:
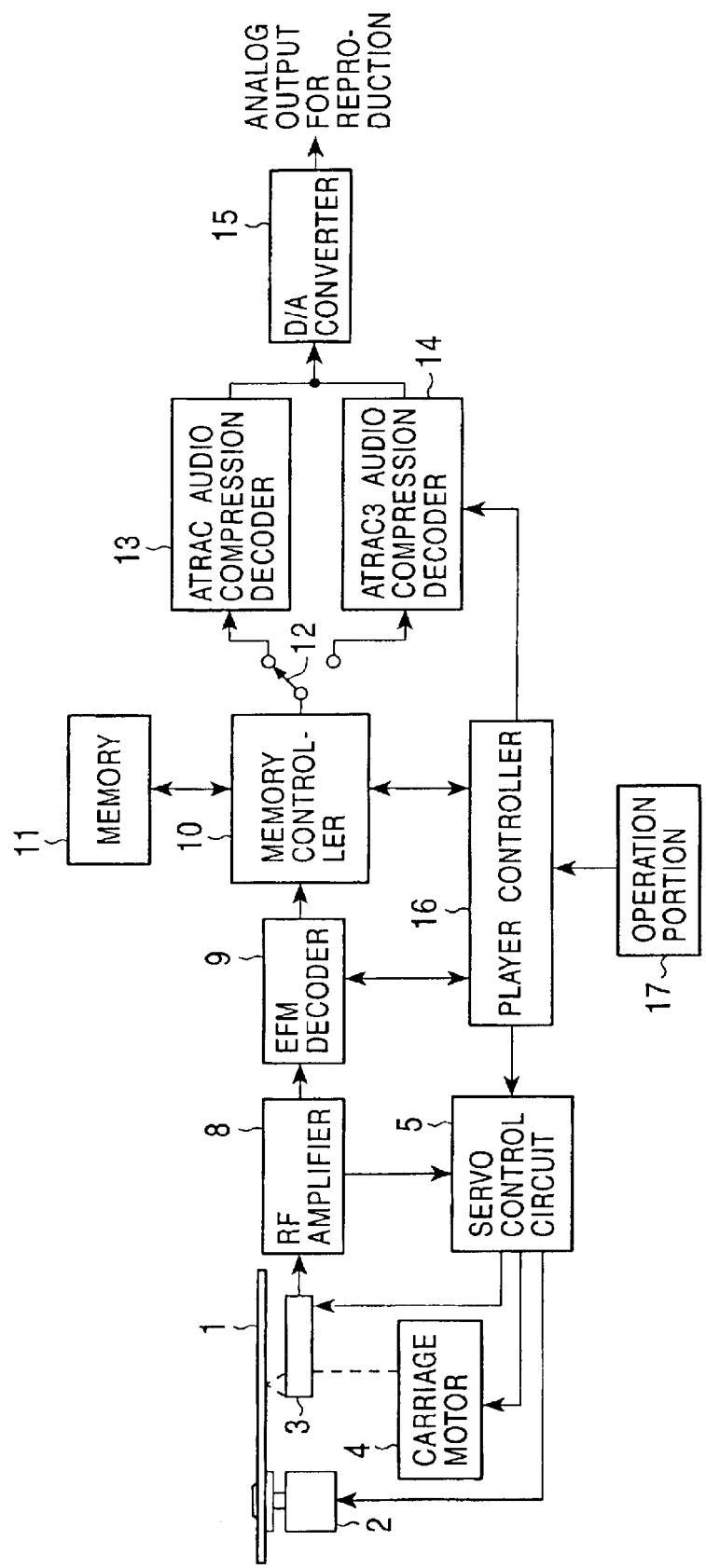
FIG. 1 is a block diagram illustrating an embodiment of the present invention.

In an MD (Mini Disc) player, shown in FIG. 1, which is an information reproducing apparatus of one embodiment of the present invention, an MD (Mini Disc) 1 is rotatably driven by a spindle motor 2. As the disc 1 is rotated, information recorded on the disc 1 is optically read by a pickup 3. The pickup 3 is supported by a carriage (not shown) which is moved by a carriage motor 4 in the radial direction of the disc 1, so that an information read point (information reading light spot) of the pickup 3 is positioned while being freely moved along the radial direction of the disc 1. Also servo control systems are provided including a spindle servo system, a focusing servo system, a tracking servo system and a carriage servo system.

The spindle motor 2 and the carriage motor 4 are controlled by a servo control circuit 5 located in the spindle servo system and the carriage servo system. The servo control circuit 5 controls the spindle motor 2 and the carriage motor 4, and carries out servo control such as on-off control of the servo systems and jump control of the information read point under a command from the player controller 16.

An RF (Radio Frequency) signal which is a read signal output from the pickup 3 is amplified by an RF amplifier 8 and then is supplied to an EFM (Eight to Fourteen Modulation) decoder 9. The EFM decoder 9 applies error correction of the CIRC (Cross Interleave Reed-Solomon Code) scheme to data of the read signal and carries out EFM demodulation. An output of the EFM decoder 9 is connected to a memory controller 10 that controls writing and reading of a memory (DRAM) 11. The memory controller 10 controls writing and reading of EFM-demodulated data to and from the memory 11 when the MD 1 is played. Data read by the memory controller 10 is deleted from the memory 11. Connected to the memory controller 10 via a selection switch 12 are two audio compression decoders 13, 14. Data read by the memory controller 10 is supplied to either one of the audio compression decoders 13, 14 selected by the selection switch 12. The audio compression decoder 13 demodulates a digital audio signal that has been compressed and recorded by means of audio compression technology of the ATRAC (Adaptive Transform Acoustic Coding) method. The audio compression decoder 14 demodulates a digital audio signal that has been compressed and recorded by the audio compression technology of the ATRAC3 method that has a higher compression rate than the ATRAC method. The audio compression technology of the ATRAC3 method has two modes of compression rate, double compression and quadruple compression. The audio compression decoder 14 corresponds to both modes of the compression rate while switching the compression rate in accordance with a command from the player controller 16. The digital audio signal provided by the audio compression decoder 13 or 14 is converted into an analog audio signal by a D/A (digital to analog) converter 15.

The EFM decoder 9, the memory controller 10, the selection switch 12 and the audio compression decoder 14 are controlled by the player controller 16. The player controller 16 also controls the MD player in response to an operation command from an operation portion 17. The player controller 16 is constituted by, for example, a micro computer.

Figure 2:
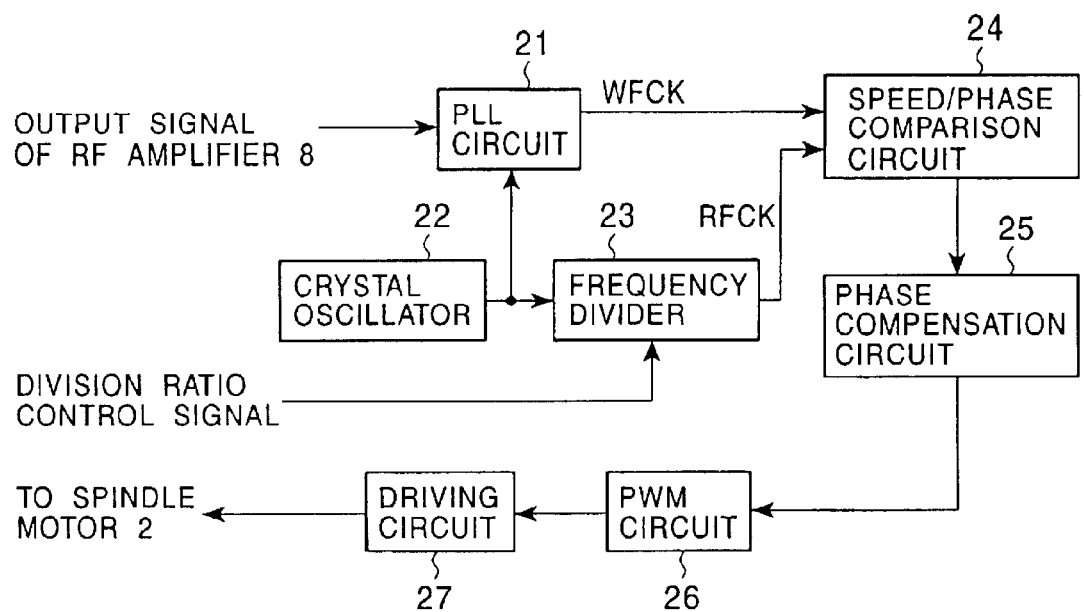
FIG. 2 is a block diagram of the configuration of a spindle servo system.

FIG. 2 shows the configuration of a spindle servo system in the servo control circuit 5 described above. The spindle servo system includes, as shown in FIG. 2, a PLL circuit 21, a crystal oscillator 22, a frequency divider 23, a speed/phase comparison circuit 24, a phase compensation circuit 25, a PWM (Pulse Width Modulation) circuit 26 and a driving circuit 27. The PLL circuit 21 detects the maximum reverse interval (11T, for example) of sequential bits from an RF signal output by the RF amplifier 8, so as to supply a synchronizing signal WFCK indicating a frequency of one frame to the speed/phase comparison circuit 24. The crystal oscillator 22 supplies an oscillation signal as a reference signal of the PLL circuit 21 to the PLL circuit 21 and also supplies the oscillation signal to the frequency divider 23. The frequency divider 23 is a programmable frequency divider circuit which divides the frequency of the oscillation signal supplied from the crystal oscillator 22 into 1/n to obtain a reference oscillation signal RFCK and supplies the reference oscillation signal RFCK to the speed/phase comparison circuit 24. The frequency division ratio 1/n of the frequency divider 23 is controlled in accordance with an instruction from the player controller 16. For reading from the disc 1, the frequency division ratio 1/n is set to a first predetermined division ratio 1/A to make the disc 1 rotate at a predetermined rotation speed for reading. The speed/phase comparison circuit 24 generates a spindle error signal corresponding to the frequency difference and phase difference between the synchronizing signal WFCK and the reference oscillation signal RFCK. The phase compensation circuit 25 is an equalizer which compensates the phase of the spindle error signal from the speed/phase comparison circuit 24 and supplies the phase-compensated spindle error signal to the PWM circuit 26. The PWM circuit 26 generates a driving signal having a pulse width of a duty ratio corresponding to the phase-compensated spindle error signal. The driving circuit 27 drives the spindle motor 2 by applying a DC (Direct Current) voltage to the spindle motor 2 in accordance with the driving signal.

In the MD player having the constitution as described above, the player controller 16 starts playback operation when a playback command is issued by a user operation on the operation portion 17.

In the playback operation, the player controller 16 first moves the information read point of the pickup 3 into a TOC (Table of Contents) area on the MD 1 to read TOC information from the TOC area (step S1) and determines TRK_MODE of a music piece to be read (step S2), as shown in FIG. 2. The TOC information includes an item called TRK_MODE which contains information for each track (music piece) of the MD. In the case of information recorded by the ATRAC method, TRK_MODE indicates whether the audio signal recorded is stereo or monaural. In the case of information recorded by the ATRAC3 method, TRK_MODE indicates whether the recorded information is compressed by the double compression or the quadruple compression. Accordingly, by using the information of TRK_MODE, it can be determined whether the information is recorded by the ATRAC method or by the ATRAC3 method. Further in the case of information recorded by the ATRAC3 method, it can be determined whether the recorded information is compressed by the double compression or the quadruple compression.

When a result of the determination in step S2 shows that the information is recorded by the ATRAC method, a data storage amount TH1 for start of outputting a reproduced signal from the MD player is set to DS1 (step S3). When the result of the determination in step S2 shows that the information is recorded by the ATRAC3 method with the double compression, the data storage amount TH1 is set to DS2 (step S4). When the result of the determination in step S2 shows that the information is recorded by the ATRAC3 method with the quadruple compression, the data storage amount TH1 is set to DS3 (step S5). The data storage amounts DS1, DS2 and DS3 are related as DS1>DS2>DS3. A time required in the case of decoding audio signal of the amount DS1 which is compressed by the ATRAC method, a time required in the case of decoding audio signal of the amount DS2 which is compressed by the ATRAC3 method with the double compression, and a time required in the case of decoding audio signal of the amount DS3 which is compressed by the ATRAC3 method with the quadruple compression are substantially the same.

After the data storage amount TH1 for the start of outputting a reproduced signal from the MD player has been set as described above, data of a music piece to be played back are read from the MD 1 and a command to store the read data in the memory 11 is issued to the memory controller 10 (step S6). The data of a music piece to be played back are read by the pickup 3 as an RF signal which is amplified by the RF amplifier 8 and then is supplied to the EFM decoder 9. The RF signal is EFM-demodulated by the EFM decoder 9, and the demodulated signal is digital data that includes audio, control and other information. The control information such as a sub code is supplied to the player controller 16. The player controller 16 controls the servo control circuit 5 in accordance with the control information. The audio information output from the EFM decoder 9, namely a compressed audio signal is written in the memory 11 by the memory controller 10.

The player controller 16, after the execution of step S6, determines-whether the amount of data RSD actually stored in the memory 11 has reached the data storage amount TH1 or not (step S7). The amount of data RSD actually stored in the memory 11 is determined by a counting operation in the memory controller 10. Specifically, the memory controller 10 up-counts by writing the data to the memory 11 and down-counts by reading the data from the memory 11. The amount of stored data RSD which has been determined is sent from the memory controller 10 to the player controller 16. When the amount of stored data RSD has increased and reached the data storage amount TH1, the player controller 16 commands a start operation to output of a reproduced signal (step S8). The command is issued to the memory controller 10 and the selection switch 12. The command is generated in response to the result of the determination in step S2, and controls the switching of the selection switch 12. In the case where the result of the determination in step S2 shows that the information is recorded by the ATRAC3 method, the player controller 16 controls the rate of decompression by the ATRAC3 audio compression decoder 14.

In the case of information recorded by the ATRAC method, the compressed audio signal which has been read from the memory 11 is sent from the memory controller 10 through the selection switch 12 to the ATRAC audio compression decoder 13 which demodulates the digital audio signal that is compressed and recorded by the ATRAC method. Then, the demodulated digital audio signal is converted into an analog reproduced audio signal by the D/A converter 15.

In the case of information compressed by the double compression or the quadruple compression and recorded by the ATRAC3 method, the compressed audio signal which has been read from the memory 11 is sent from the memory controller 10 through the selection switch 12 to the ATRAC3 audio compression decoder 14 which demodulates the digital audio signal that is compressed by the double compression or the quadruple compression of the ATRAC3 method. Then, the demodulated digital audio signal is converted into analog reproduced audio signal by the D/A converter 15.

The player controller 16, after starting the output of the reproduced signal, determines whether the amount of data RSD actually stored in the memory 11 has reached a full data storage amount THfull or not (step S9). The full data storage amount THfull is the maximum amount of data which can be stored in the memory 11. When the amount of stored data RSD has reached the full data storage amount THfull, the player controller 16 commands the memory controller 10 to stop writing data (step S10), and commands the servo control circuit 5 to enter a pause state and to turn off the servo systems without at least the spindle servo system and the focusing servo system (step S11). Accordingly, writing of data to the memory 11 is stopped, driving of the pickup 3 by the servo control circuit 5 is stopped, and operations of the tracking servo system and the carriage servo system are stopped.

In addition, the player controller 16 sets the division ratio 1/n of the frequency divider 23 to a second predetermined division ratio 1/B, which is smaller than (has a larger n than) the first predetermined division ratio 1/A (step S12). Thus, the frequency of the reference oscillation signal RFCK output from the frequency divider 23 decreases and the spindle error signal output from the speed/phase comparison circuit 24 becomes a signal to decrease the rotational speed of the spindle motor 2. The spindle error signal is supplied to the PWM circuit 26 via the phase compensation circuit 25, and the driving circuit 27 drives the spindle motor 2 in accordance with the driving signal from the PWM circuit 26. Thus, the rotational speed of the spindle motor 2 decreases from that for reading from the MD 1 and is finally locked to a low rotational speed corresponding to the frequency of the reference oscillation signal RFCK by the operation of the spindle servo system. For example, by providing (B=2A), the first predetermined division ratio 1/A and the second predetermined division ratio 1/B can be set so that the rotational speed is half a predetermined rotational speed for reading from the disc 1 decided by the first predetermined division ratio 1/A. Note that A and B can be set properly in accordance with the player performance or the like only if they satisfy the relation of A<B. In addition, the focusing servo system continues the focusing operation.

The player controller 16, after the execution of step S12, determines TRK_MODE of the music piece of which data has been stored in the memory 11 (step S13). This is similar to the determination in step S2.

When a result of the determination in step S13 shows that the information is recorded by the ATRAC method, the data storage amount TH2 for resumption of storing data to the memory 11 is set to DR1 (step S14). When the result of the determination in step S13 shows that the information is recorded by the ATRAC3 method with the double compression, the data storage amount TH2 is set to DR2 (step S15). When the result of the determination in step S13 shows that the information is recorded by the ATRAC3 method with the quadruple compression, the data storage amount TH2 is set to DR3 (step S16).

After setting the data storage amount TH2 for the resumption of storing data to the memory 11 as described above, it is determined whether the amount of stored data RSD in the memory 11 has reached the data storage amount TH2 for the resumption of storage (step S17). When the amount of stored data RSD that is stored has decreased to the data storage amount TH2, the player controller 16 commands the servo control circuit 5 to cancel the pause state and to turn on the servo systems without the spindle servo system and the focusing servo system (step S18), and sets the division ratio 1/n of the frequency divider 23 to the first predetermined division ratio 1/A (Step S19). Further, the player controller 16 commands the memory controller 10 to restart writing of data (step S20). Accordingly driving of the pickup 3 is resumed by the servo control circuit 5, and operations of the tracking servo system and the carriage servo system are resumed. Further, by the operation of the spindle servo system, the rotational speed of the spindle motor 2 is increased from a lower speed to return to the speed for reading from MD 1. Thus similarly to the case of step S6, data of the music piece to be played back is read from the pickup 3 as the RF signal, and the RF signal is sent through the RF amplifier 8 and the EFM decoder 9 to the memory controller 10 as compressed audio signal, while writing of the compressed audio signal in the memory 11 by the memory controller 10 is restarted.

After the execution of step S20, the control returns to step S9, so that the operations described above are repeated.

Figure 4A:
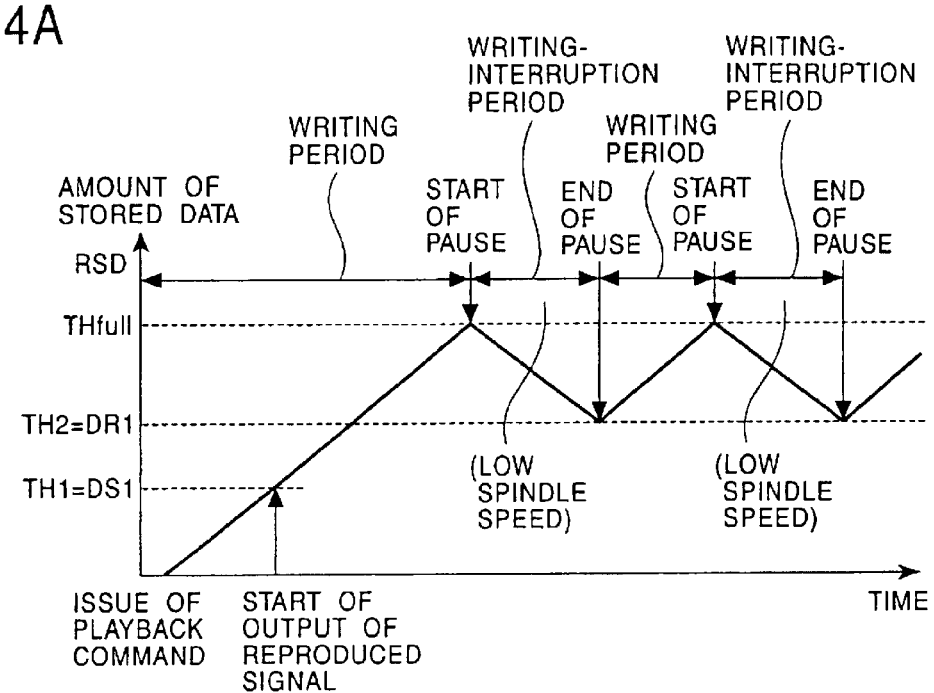
Figure 4B:
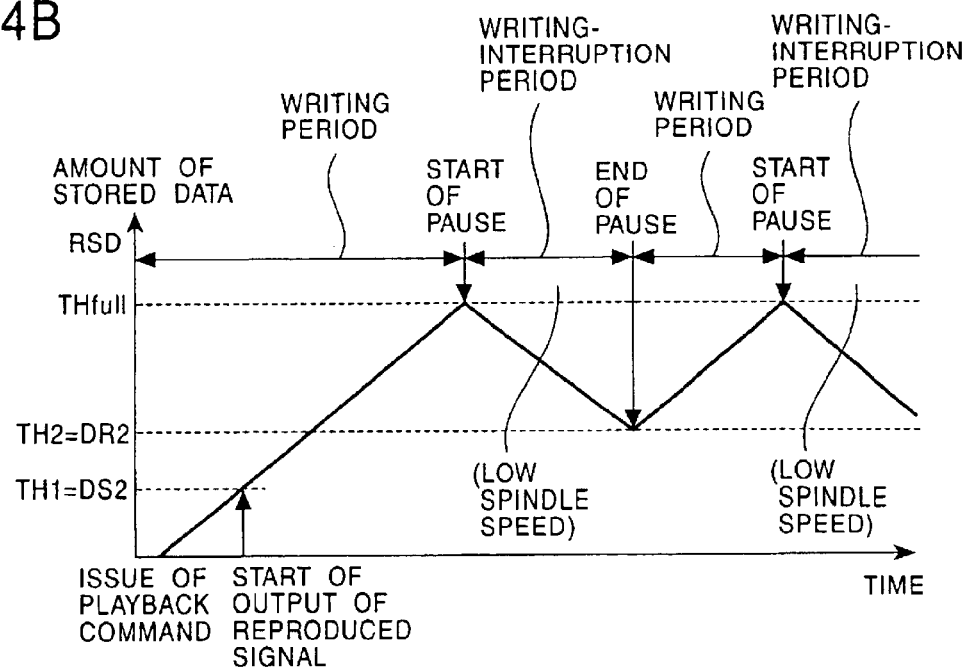

FIG. 4A through FIG. 4C show variations in the amount of stored data RSD during playback of the MD 1 in the MD player described above. FIG. 4A shows the case where the compressed audio signal of the music piece to be played back is recorded by the ATRAC method, FIG. 4B shows the case where the compressed audio signal of the music piece to be played back is recorded by the ATRAC3 method with the double compression, and FIG. 4C shows the case where the compressed audio signal of the music piece to be played back is recorded by the ATRAC3 method with the quadruple compression.

As shown in FIG. 4A through FIG. 4C, when a playback command is produced at the operation portion 17, data of the music piece to be played back is read from the MD 1, and the data which has been read is stored in the memory 11. After the playback command is issued, the amount of stored data RSD in the memory 11 gradually increases. When the amount of stored data RSD in the memory 11 reaches the data storage amount TH1 for the start of outputting a reproduced signal, the compressed audio signal is read from the memory 11 in step S8 and is sent through the audio compression decoder 13 or 14 and the D/A converter 15 so that an analog reproduced audio signal is output. The data storage amount TH1 is set to one of DS1 through DS3, the amounts being related as DS1>DS2>DS3. In the case the compressed audio signal of the music piece to be played back is recorded by the ATRAC method, the amount of data RSD that is stored in the memory 11 reaches the amount DS1, the largest among DS1 through DS3, as shown in FIG. 4A. In the case where the compressed audio signal of the music piece to be played back is recorded by the ATRAC3 method with the double compression, the amount of stored data RSD in the memory 11 reaches the amount DS2 which is the intermediate level among DS1 through DS3 as shown in FIG. 4B. In the case where the compressed audio signal of the music piece to be played back is recorded by the ATRAC3 method with the quadruple compression, the amount of stored data RSD in the memory 11 reaches the amount DS3, the lowest level among DS1 through DS3, as shown in FIG. 4C. Thus, the analog reproduced audio signal is output in the order of information recorded by the ATRAC3 method with the quadruple compression, information recorded by the ATRAC3 method with the double compression and information recorded by the ATRAC method.

After that, when the amount of stored data RSD in the memory 11 has increased further to reach the full data storage amount THfull, writing to the memory 11 is stopped and the reading from the MD 1 is paused. Accordingly, the amount of stored data RSD gradually decreases after reaching the full data storage amount THfull.

In the paused state, or a writing-interruption period during which no data is written, the execution of step S12 above sets the division ratio 1/n of the frequency divider 23 to the second predetermined division ratio 1/B, which is smaller than the first predetermined division ratio 1/A. The rotational speed of the spindle motor 2 is maintained at a lower speed than the speed for reading from the MD 1. By the operation, power consumption of the player during the writing-interruption period can be decreased.

When the amount of stored data RSD in the memory 11 has decreased to the data storage amount TH2 for the resumption of storage, the pause state is canceled to resume reading of the data of music piece to be played back from the MD 1, and the data that has been read is stored by writing in the memory 11. The data storage amount TH2 for the resumption of storage is set to one of DR1 through DR3 of which amounts are related as DR1>DR2>DR3. In the case where the compressed audio signal of the music piece to be played back is recorded by the ATRAC method, the amount of stored data RSD in the memory 11 reaches the amount DR1, the largest among DR1 through DR3, as shown in FIG. 4A. In the case where the compressed audio signal of the music piece to be played back is recorded by the ATRAC3 method with the double compression, the amount of stored data RSD in the memory 11 reaches the amount DR2, the intermediate level among DR1 through DR3, as shown in FIG. 4B. In the case where the compressed audio signal of the music piece to be played back is recorded by the ATRAC3 method with the quadruple compression, the amount of stored data RSD in the memory 11 reaches the amount DR3, the lowest level among DR1 through DR3, as shown in FIG. 4C.

When the amount of stored data RSD reaches the data storage amount TH2 for starting re-storing, driving of the pickup 3 is restarted and the operations of the tracking servo system and the carriage servo system are restarted. Further, as a result of the execution of step S19, the division ratio 1/n of the frequency divider 23 is set to the first predetermined division ratio 1/A for disc reading. Thus, by the operation of the spindle servo system, the rotational speed of the spindle motor 2 increases from a low spindle speed and returns to the speed for reading from the MD 1. This return to the speed for reading from the MD 1 is made more quickly than when rotation by the spindle motor 2 is stopped. In addition, when the stopped spindle motor 2 is activated, a large amount of power is consumed. However, only a small amount of power consumption is required for increasing the spindle speed when returning from a low spindle speed to the speed for reading from the MD 1.

When the servo system operation is thus returned to the data writing state, an instruction for restarting data writing is given and the storing of read data to the memory 11 is restarted. The time period for interrupting data writing to the memory 11 is shortest for information recorded with the ATRAC3 method with the quadruple compression. The time period for interrupting becomes longer in the order of the ATRAC3 method with the quadruple compression, the ATRAC3 method with the double compression, and the ATRAC method.

During the subsequent playback of the MD 1, the storage of data to the memory 11 and the interruption of the storage are repeated as described above.

Since the reading operation by the pickup 3 can be paused for a longer time in the case of recorded information that has been compressed by a higher compression rate, as described above, power consumption can be reduced. The pickup 3 can also be used in reading the information recorded on other parts of the MD 1 during the pause of the reading operation of the pickup 3, namely during the pause of storing data in the memory 11.

Although the MD 1 is described as a disc in the above embodiment, the present invention is not limited to an MD disc. The present invention is applicable to any reproducing apparatus which plays another type of disc having compressed information recorded thereon.

Although the spindle servo system using the frequency of the synchronizing signal obtained from the read signal for controlling the spindle speed is adopted in the above embodiment, a spindle servo system which extracts, from the read signal, a wobble signal corresponding to a groove section of a disc and uses the frequency of the wobble signal for controlling the spindle speed may also be adopted.

Figure 5:
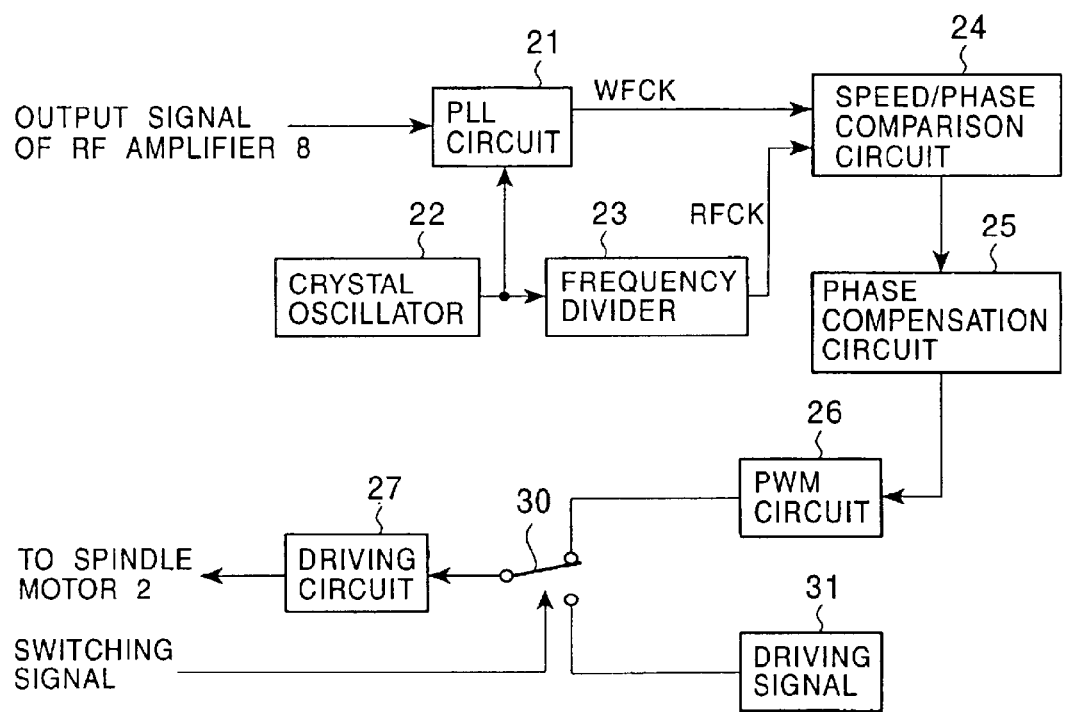
FIG. 5 is a block diagram of the configuration of a spindle servo system as another embodiment of the present invention.

Furthermore, the spindle servo system shown in FIG. 2 may have a configuration shown in FIG. 5. Specifically, for the configuration of the spindle servo system shown in FIG. 2, a changeover switch 30 and a driving signal generation circuit 31 are added. The changeover switch 30 is controlled for switching by the player controller 16, and usually supplies an output signal of the PWM circuit 26 to the driving circuit 27. During the time period for interrupting data-writing to the memory 11, The changeover switch 30 supplies an output signal of the driving signal generation circuit 31 to the driving circuit 27. The driving signal generation circuit 31 generates a driving signal having a pulse width of the duty ratio for forcefully providing the spindle motor 2 with a predetermined low speed. The changeover switch 30 starts relaying the output signal of the driving signal generation circuit 31 at the execution timing of step S12 above and returns to relaying the output signal of the PWM circuit 26 to the driving circuit 27 at the execution timing of step S19. In the configuration of FIG. 5, since the driving circuit 27 drives the spindle motor 2 in accordance with the driving signal from the driving signal generation circuit 31 during the writing-interruption period, the rotational speed of the spindle motor 2 is maintained at a lower speed than that for reading from the MD 1. Thus, power consumption of the player can be decreased. In the configuration of FIG. 5, the division ratio 1/n of the frequency divider 23 may be fixed to the first predetermined division ratio 1/A for disc reading even during the writing interruption period, and the focus servo system may be turned off during the writing-interruption period.

As described above, an information reproducing apparatus according to the present invention decreases the rotational speed of spindle motor during the writing-interruption period to a lower speed than that during the period when the compressed information is written to the memory. Thus, power consumption of the apparatus during the writing-interruption period can be reduced and rewriting to the memory can be started immediately after the end of the writing-interruption period.

This application is based on Japanese Patent Application No. 2001-15724 which is hereby incorporated by reference.

What is claimed is:

1. An apparatus for reproducing information by expanding compressed information recorded on a disc, comprising:

spindle driving means for driving a spindle motor for rotating said disc;

reading means for reading the compressed information from said disc rotated by said spindle motor;

memory control means for writing the compressed information read by said reading means to a memory, to read out the compressed information written from the memory in the order of writing and for supplying the read information to expansion means for expanding the compressed information read by said memory control means and outputting reproduced information based on the expanded information; and storage amount control means for stopping the writing of the compressed information to said memory by said memory control means when an amount of the compressed information unread from said memory after writing thereto increases to a first predetermined amount and for restarting the writing of the compressed information to said memory by said memory control means when the amount of the compressed information unread from said memory after writing thereto decreases to a second predetermined amount which is smaller than said first predetermined amount and which is an amount corresponding to the compression ratio of the compressed information, wherein said spindle driving means decreases the rotational speed of said spindle motor during a writing-interruption period for a time from stoppage of the writing of the compressed information to said memory by said storage amount control means to the restarting of the writing, to a lower speed level than a rotational speed level during a writing period when the compressed information is written to said memory.

2. An apparatus according to claim 1, wherein said storage amount control means stops the reading of the compressed information from said disc by said reading means during the writing-interruption period.

3. An apparatus according to claim 1, wherein said spindle driving means includes:

extraction means for extracting a synchronizing signal from an output signal of said reading means;

frequency dividing means for dividing the frequency of an oscillation signal having a predetermined frequency;

frequency/phase comparison means for comparing in frequency and phase the synchronizing signal and an output signal of said frequency dividing means to generate a spindle error signal;

PWM (pulse width modulation) means for generating a driving signal with a pulse width corresponding to the spindle error signal; and voltage application means for applying a voltage to said spindle motor in accordance with the driving signal, wherein the division ratio of said frequency dividing means is set to a first predetermined division ratio during the writing period and is set to a second predetermined division ratio which is smaller than the first predetermined division ratio during the writing-interruption period.

4. An apparatus according to claim 1, wherein said spindle driving means includes:

extraction means for extracting a synchronizing signal from an output signal of said reading means;

frequency dividing means for dividing the frequency of an oscillation signal having a predetermined frequency;

frequency/phase comparison means for comparing in frequency and phase the synchronizing signal and an output signal of said frequency dividing means to generate a spindle error signal;

PWM means for generating a driving signal with a pulse width corresponding to the spindle error signal; and voltage application means for applying a voltage to said spindle motor in accordance with the driving signal, wherein said voltage application means applies the voltage to said spindle motor in accordance with a forcible driving signal having a pulse width for providing said spindle motor with a low speed instead of the driving signal during the writing-interruption period.

* * * * *